United States Patent
Igarashi

(10) Patent No.: US 11,059,172 B2
(45) Date of Patent: Jul. 13, 2021

(54) CONTROL APPARATUS AND ROBOT SYSTEM

(71) Applicant: Seiko Epson Corporation, Tokyo (JP)

(72) Inventor: Katsuji Igarashi, Chino (JP)

(73) Assignee: Seiko Epson Corporation

( * ) Notice: Subject to any disclaimer, the term of this patent is extended or adjusted under 35 U.S.C. 154(b) by 501 days.

(21) Appl. No.: 15/976,082

(22) Filed: May 10, 2018

(65) Prior Publication Data

US 2018/0333848 A1  Nov. 22, 2018

(30) Foreign Application Priority Data

May 16, 2017 (JP) .............................. JP2017-097040

(51) Int. Cl.
   B25J 9/16     (2006.01)
   B25J 11/00    (2006.01)
   B05C 5/02     (2006.01)
   B05C 11/10    (2006.01)

(52) U.S. Cl.
   CPC ............... *B25J 9/1664* (2013.01); *B05C 5/02* (2013.01); *B05C 11/1018* (2013.01); *B25J 9/1694* (2013.01); *B25J 11/0075* (2013.01); *B05C 5/0216* (2013.01); *Y10S 901/10* (2013.01); *Y10S 901/43* (2013.01)

(58) Field of Classification Search
   CPC .... B25J 9/1664; B25J 9/1694; B25J 11/0075; B25J 13/00; B05C 5/02; Y10S 901/43; Y10S 901/10; B65D 2585/6852; B05B 9/002

See application file for complete search history.

(56) References Cited

U.S. PATENT DOCUMENTS

| 2015/0183113 A1 | 7/2015 | Wakaizumi |
| 2016/0067732 A1 | 3/2016 | Nakamura |
| 2016/0306364 A1 * | 10/2016 | Ikushima ................... B25J 9/20 |
| 2017/0359901 A1 * | 12/2017 | Orla-Jensen ......... H05K 3/0008 |

FOREIGN PATENT DOCUMENTS

| JP | 2010-194399 A | | 9/2010 |
| JP | 2013-071039 A | | 4/2013 |
| JP | 2014050960 A | * | 3/2014 |
| JP | 2015-127080 A | | 7/2015 |
| JP | 2016-055250 A | | 4/2016 |

OTHER PUBLICATIONS

JP2014050960A—translation (Year: 2014).*

* cited by examiner

Primary Examiner — Abby Y Lin
Assistant Examiner — Renee LaRose
(74) *Attorney, Agent, or Firm* — Harness, Dickey & Pierce, P.L.C.

(57) ABSTRACT

A control apparatus includes a processor that is configured to execute computer-executable instructions so as to control a robot supporting a dispenser, wherein the processor is configured to calculate a movement velocity of a landing point where a discharge substance discharged from a discharge port of the dispenser to an object lands on the object, wherein the movement velocity is used for controlling a discharge amount of the discharge substance.

6 Claims, 7 Drawing Sheets

CONTROL APPARATUS AND ROBOT SYSTEM

BACKGROUND

1. Technical Field

The present invention relates to a control apparatus, and a robot system.

2. Related Art

An industrial robot including a robot arm and an end effector attached to a tip of the robot arm has been known. In recent years, a robot connected to a coating apparatus that coats a coating material to a substance to be coated is known (refer to JP-A-2015-127080).

For example, the robot disclosed in JP-A-2015-127080 includes a holding portion that holds the coating apparatus, a movement velocity setting section that sets a movement velocity of the holding portion, and a coating amount adjusting section that adjusts a supply amount of the coating material by the coating apparatus.

The robot having such a configuration disclosed in JP-A-2015-127080 adjusts the supply amount of the coating material according to the movement velocity of the holding portion. For example, in a case where the coating material is coated to a flat substance to be coated, since it is possible to coincide the movement velocity of the holding portion with a drawing velocity of a trajectory drawn by the coating material landing on the substance to be coated, it is possible to reproduce a target trajectory in this robot. However, in a case where the coating material is coated to a recessed substance to be coated, the movement velocity of the holding portion and the drawing velocity of the trajectory of the coating material do not coincide with each other. Consequently, it is not possible to reproduce the target trajectory in this robot.

Thus, since it is not possible to reproduce the target trajectory due to a shape and the like of an object, there is a case where a desired amount of the coating material cannot be coated to a target place in the robot of the related art.

SUMMARY

An advantage of some aspects of the invention is to solve at least a part of the problems described above, and the invention can be implemented as the following forms or application examples.

A control apparatus according to an application example controls a robot supporting a discharge section, and includes a calculation section that calculates a movement velocity of a landing point where a discharge substance discharged from a discharge port of the discharge section to an object lands on the object. The movement velocity obtained by the calculation section is used for controlling a discharge amount of the discharge substance.

According to such control apparatus, since the movement velocity at the landing point is used for controlling the discharge amount, it is possible to draw a target trajectory regardless of a shape and the like of the object. Therefore, it is possible to discharge the discharge substance with a desired discharge amount to a target place. Consequently, it is possible to realize discharge work with high quality.

In the control apparatus according to the application example, it is preferable that a position of the landing point is obtained based on a distance between the discharge port and the landing point, and a position of the discharge port.

With this configuration, it is possible to easily and appropriately obtain the movement velocity at the landing point.

In the control apparatus according to the application example, it is preferable that the distance is a distance between the discharge port and the object in a discharge direction in which the discharge section discharges the discharge substance.

With this configuration, it is possible to appropriately obtain the movement velocity at the landing point.

In the control apparatus according to the application example, it is preferable that the distance is obtained based on information output from a distance sensor.

With this configuration, it is possible to appropriately obtain the movement velocity at the landing point. Even in a case where the distance is not constant, it is possible to draw the target trajectory by using the distance sensor.

In the control apparatus according to the application example, it is preferable to further include an output section that outputs the movement velocity obtained by the calculation section to a discharge control apparatus for controlling a discharge by the discharge section.

With this configuration, the discharge apparatus can control the discharge section so as to accurately draw the target trajectory regardless of the shape and the like of the object by obtaining the discharge amount based on the acquired movement velocity (information relating to movement velocity).

In the control apparatus according to the application example, it is preferable to further include a discharge control section that controls the discharge by the discharge section.

With this configuration, since the control apparatus includes the discharge section and the calculation section, it is possible to achieve miniaturization and simplification of the control apparatus.

In the control apparatus according to the application example, it is preferable that the robot is a vertical articulated robot.

With this configuration, it is possible to position the discharge section at the target place. Consequently, it is possible to realize the discharge work with higher quality regardless of the shape of the object.

In the control apparatus according to the application example, it is preferable that driving of the robot is controlled so as to change a posture of the discharge section while maintaining the position of the discharge port fixed in the discharge by the discharge section.

With this configuration, for example, even in a case where a movement velocity of the discharge port of the discharge section and the movement velocity at the landing point do not coincide with each other as in an object having a recessed form, it is possible to accurately draw the target trajectory.

A robot according to an application example includes an arm that supports the discharge section and is controlled by the control apparatus according to the application example.

According to such robot, it is possible to position a discharge substance at a target place. Consequently, it is possible to realize discharge work with high quality.

A robot system according to an application example includes: the control apparatus according to the application example; the robot which is controlled by the control apparatus; and the discharge section which is provided in the robot and is capable of discharging the discharge substance.

According to such robot system, it is possible to draw a target trajectory. Therefore, it is possible to discharge the discharge substance with a desired discharge amount to a target place. Consequently, it is possible to realize discharge work with high quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of a control apparatus, a robot, and a robot system will be described in detail based on the accompanying drawings.

Robot System

Figure 1:
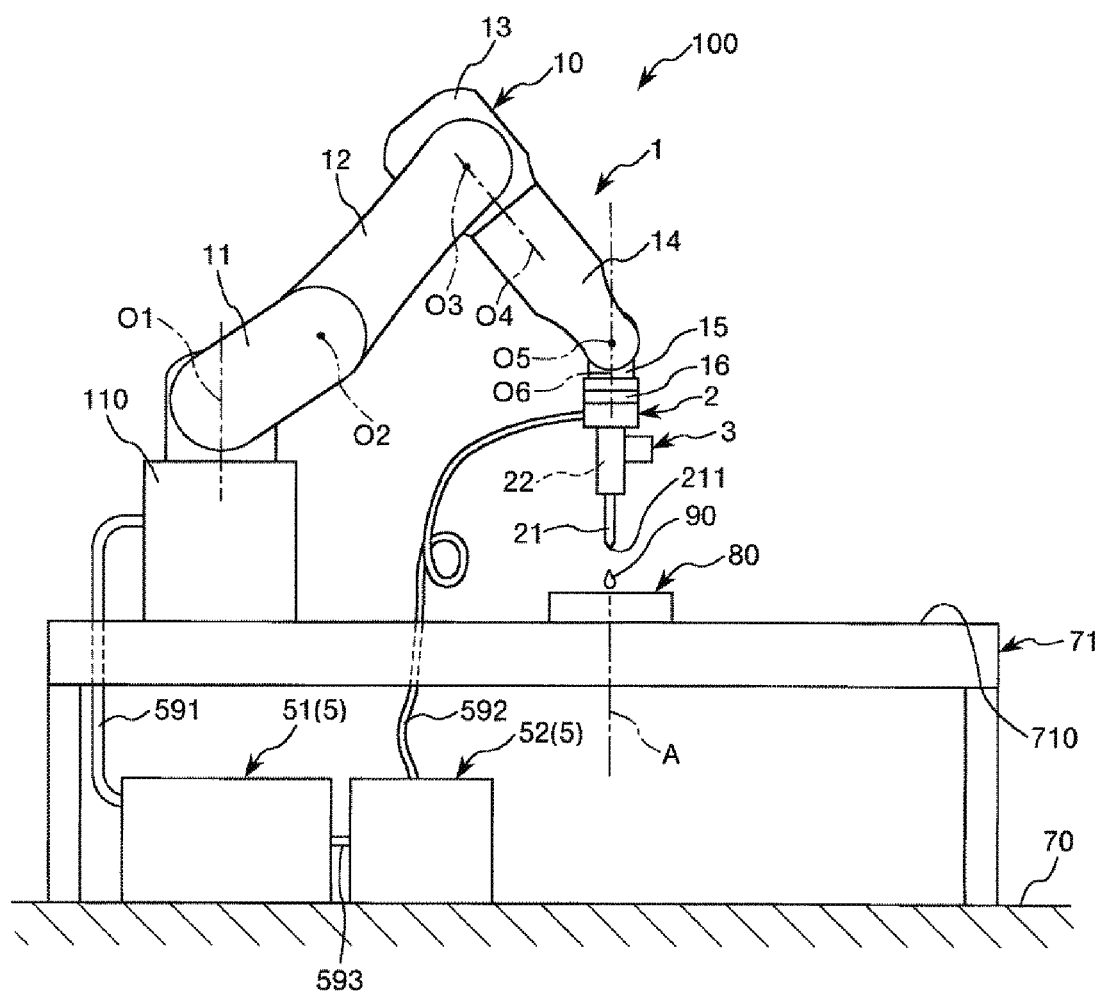
FIG. 1 is a schematic side view of a robot system according to a first embodiment.
Figure 2:
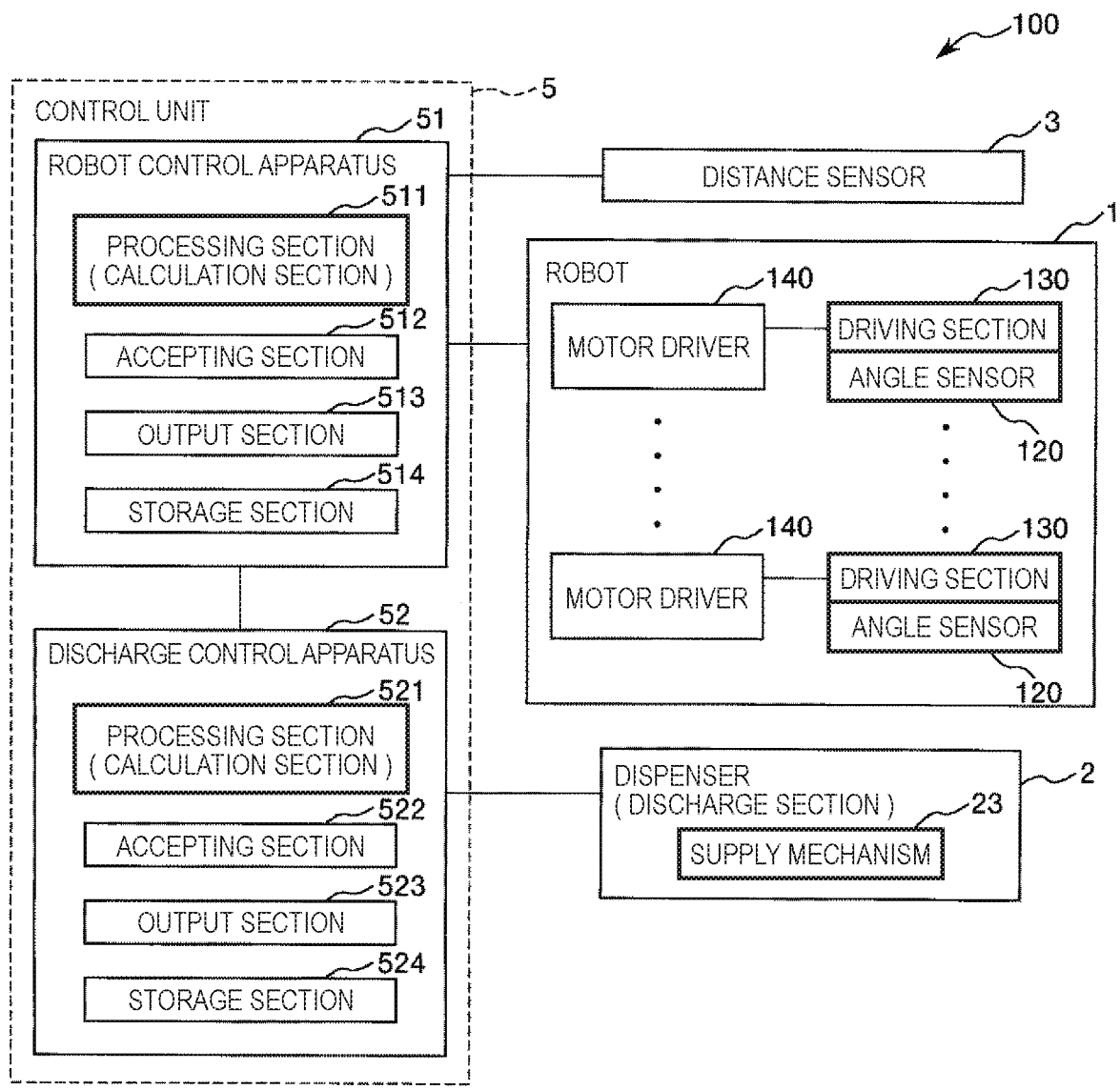
FIG. 2 is a system configuration diagram of the robot system illustrated in FIG. 1.

FIG. 1 is a schematic side view of a robot system according to a first embodiment. FIG. 2 is a system configuration diagram of the robot system illustrated in FIG. 1.

In the following description, the upper side of FIG. 1 is referred to as "upper", and the lower side thereof is referred to as "lower" for the convenience of description. A base side of FIG. 1 is referred to as "base end", and an opposite side (dispenser 2 side) thereof is referred to as "tip end". In the specification, "horizontal" includes a case where it is inclined within a range of ±5° or less with respect to the horizontal. Similarly, in the specification, "vertical" includes a case where it is inclined within a range of ±5° or less with respect to the vertical. The "parallel" includes not only a case where two lines (include axes) or planes are perfectly parallel to each other but also a case where they are inclined within ±5°. In the specification, "orthogonal" includes not only a case where two lines (include axes) or planes intersect at an angle of 90° with each other but also a case where they are inclined within ±5° with respect to 90°.

A robot system 100 illustrated in FIG. 1 includes a robot 1, a dispenser 2 (discharge section) which is provided in the robot 1 and is capable of discharging a discharge substance 90, a distance sensor 3 provided on the dispenser 2, and a control unit 5 that controls driving of the robot 1 and the dispenser 2. The control unit 5 includes a robot control apparatus 51 that controls the driving of the robot 1 and a discharge control apparatus 52 that controls a discharge (driving) of the dispenser 2.

The robot system 100 performs discharge work (coating work) for discharging the discharge substance 90 such as a liquid adhesive to an object 80, for example, a precision instrument such as a wristwatch and a mobile phone, parts thereof, or the like.

Robot

The robot 1 illustrated in FIG. 1 is a six-axis vertical articulated robot. The robot 1 has a base 110 and a robot arm 10 connected to the base 110 in a rotatable manner. As illustrated in FIG. 2, the robot 1 includes a plurality of driving sections 130, a plurality of motor drivers 140, and a plurality of angle sensors 120. The plurality of motor drivers 140 may be included not in the robot 1, but in the robot control apparatus 51.

As illustrated in FIG. 1, the robot 1 is provided on a work surface 710 which is the upper surface of a worktable 71 mounted on a mounting place 70 such as a floor in the embodiment. The base 110 is fixed on the work surface 710 in the embodiment, but the base 110 may be movable as long as the robot arm 10 is connected.

The robot arm 10 has a first arm 11 (arm), a second arm 12 (arm), a third arm 13 (arm), a fourth arm 14 (arm), a fifth arm 15 (arm), and a sixth arm 16 (arm). The first arm 11, the second arm 12, the third arm 13, the fourth arm 14, the fifth arm 15, and the sixth arm 16 are connected in this order from a base end side to a tip end side. The first arm 11 is connected to the base 110 attached on the work surface 710. The dispenser 2 is attached to a tip end portion of the sixth arm 16 in a detachable manner.

The base 110 and the arm 11 are connected through a joint, and the first arm 11 is rotatable around a first rotation axis O1 along the vertical direction with respect to the base 110. The first arm 11 and the second arm 12 are connected through a joint, and the second arm 12 is rotatable around a second rotation axis O2 along the horizontal direction with respect to the first arm 11. The second arm 12 and the third arm 13 are connected through a joint, and the third arm 13 is rotatable around a third rotation axis O3 along the horizontal direction with respect to the second arm 12. The third arm 13 and the fourth arm 14 are connected through a joint, and the fourth arm 14 is rotatable around a fourth rotation axis O4 orthogonal to the third rotation axis O3 with respect to the third arm 13. The fourth arm 14 and the fifth arm 15 are connected through a joint, and the fifth arm 15 is rotatable around a fifth rotation axis O5 orthogonal to the fourth rotation axis O4 with respect to the fourth arm 14. The fifth arm 15 and the sixth arm 16 are connected through a joint, and the sixth arm 16 is rotatable around a sixth rotation axis O6 orthogonal to the fifth rotation axis O5 with respect to the fifth arm 15.

As illustrated in FIG. 2, the robot 1 includes the plurality of driving sections 130 having a motor for rotating one arm with respect to the other arm (or base 110), a speed reducer, and the like. The plurality of driving sections 130 are provided in each of arms 11 to 16 (not illustrated). Therefore, the robot 1 includes the same number (six in the embodiment) of driving sections 130 as the arms 11 to 16 in the embodiment. The motor driver 140 is electrically connected to each driving section 130, and each driving section 130 is controlled by the control unit 5 through the motor driver 140, specifically, the robot control apparatus 51 described below.

The angle sensor 120 such as a rotary encoder is provided in each driving section 130. Accordingly, it is possible to measure a rotation angle of a rotation axis of the motor or the speed reducer included in each driving section 130. Accordingly, it is possible to obtain information such as an angle (posture) of an arm on the tip end side with respect to an arm on the base end side.

As described above, the robot 1 described above has the sixth arm 16 (robot arm 10) to which the dispenser 2 is attached. That is, the robot 1 has the sixth arm 16 (robot arm 10) for supporting the dispenser 2 (discharge section) that discharges the discharge substance 90 to the object 80. The robot 1 is controlled by the control unit 5 described below. Therefore, the robot 1 can position the dispenser 2 at a target place by driving the robot arm 10 under control of the control unit 5. Consequently, it is possible to realize the discharge work with higher quality.

As described above, the robot 1 is the vertical articulated robot. Accordingly, it is possible to position the dispenser 2 at the target place regardless of the shape and the like of the object 80. Consequently, it is possible to realize the discharge work with higher quality regardless of the shape and the like of the object 80.

The number of arms of the robot 1 is six in the embodiment, but the number of arms may be one to five, or may be seven or more. However, in a case where the dispenser 2 (discharge section) is provided at the tip end portion of the robot arm 10, it is preferable that the number of arms (the number of rotation axes) is at least six or more in order to position the tip end of the dispenser 2 (discharge section) at the target place in the three-dimensional space.

Each of arms 11 to 16 is rotatable with respect to an adjacent arm or the base 110 in the embodiment, but the robot arm 10 may have arms translatable with respect to an adjacent arm or the base 110. In this case, it is possible to use a position sensor configured to have a linear encoder instead of the angle sensor 120.

The robot 1 may have, for example, a force sensor for detecting contact of the dispenser 2 to the object 80.

Dispenser

The dispenser 2 illustrated in FIG. 1 is a discharge section that is capable of discharging the discharge substance 90. Here, all of a discharged substance and a substance to be discharged are collectively referred to as the discharge substance 90 in the specification.

The dispenser 2 has a main body portion 22 having an accommodating portion accommodating (storing) the discharge substance 90, and a nozzle 21 (needle) connected to the tip end side of the main body portion 22 and including a discharge port 211 that discharges the discharge substance 90. The dispenser 2 is attached to the sixth arm 16 in a detachable manner such that the discharge port 211 faces the tip end side (lower side of FIG. 1) of the robot arm 10. Accordingly, it is possible to discharge the discharge substance 90 to the tip end side of the robot arm 10. In the embodiment, a center line A of the nozzle 21 coincides with the sixth rotation axis O6, and the discharge port 211 (specifically, the center of opening of discharge port 211) of the dispenser 2 is positioned on the sixth rotation axis O6.

As illustrated in FIG. 2, the dispenser 2 has a supply mechanism 23 that supplies a predetermined amount of the discharge substance 90 from the main body portion 22 to the nozzle 21. The supply mechanism 23 is controlled by the control unit 5, specifically, the discharge control apparatus 52 described below. A specific configuration of the supply mechanism 23 is not particularly limited. For example, there are configurations such as (1) configuration having a driving mechanism and the like, such as a syringe, a plunger, and a motor for driving a plunger, (2) configuration in which the discharge substance 90 is pressure-fed to the nozzle 21 by air pressure, and (3) configuration having a driving mechanism, such as a rotor, a stator, and a motor for driving a rotor, and rotating the rotor in the stator to transport the discharge substance 90 to the nozzle 21.

Such a dispenser 2 can continuously or intermittently discharge a certain amount of the discharge substance 90 based on control of the discharge control apparatus 52. The dispenser 2 can also change a discharge amount M (discharge amount per unit time) of the discharge substance 90 based on control of the discharge control apparatus 52.

The dispenser 2 is attached to the sixth arm 16 in the embodiment. However, the dispenser 2 may be attached to the robot 1 (in particular, robot arm 10) and may be attached to arms 11 to 15 other than the sixth arm 16. The dispenser 2 may be not attached directly to a predetermined arm and may be attached to a predetermined arm through a predetermined member. An attachment direction of the dispenser 2 (posture of nozzle 21) is also not particularly limited.

Distance Sensor

As illustrated in FIG. 1, the distance sensor 3 is attached to the dispenser 2 in a detachable manner.

Figure 3:
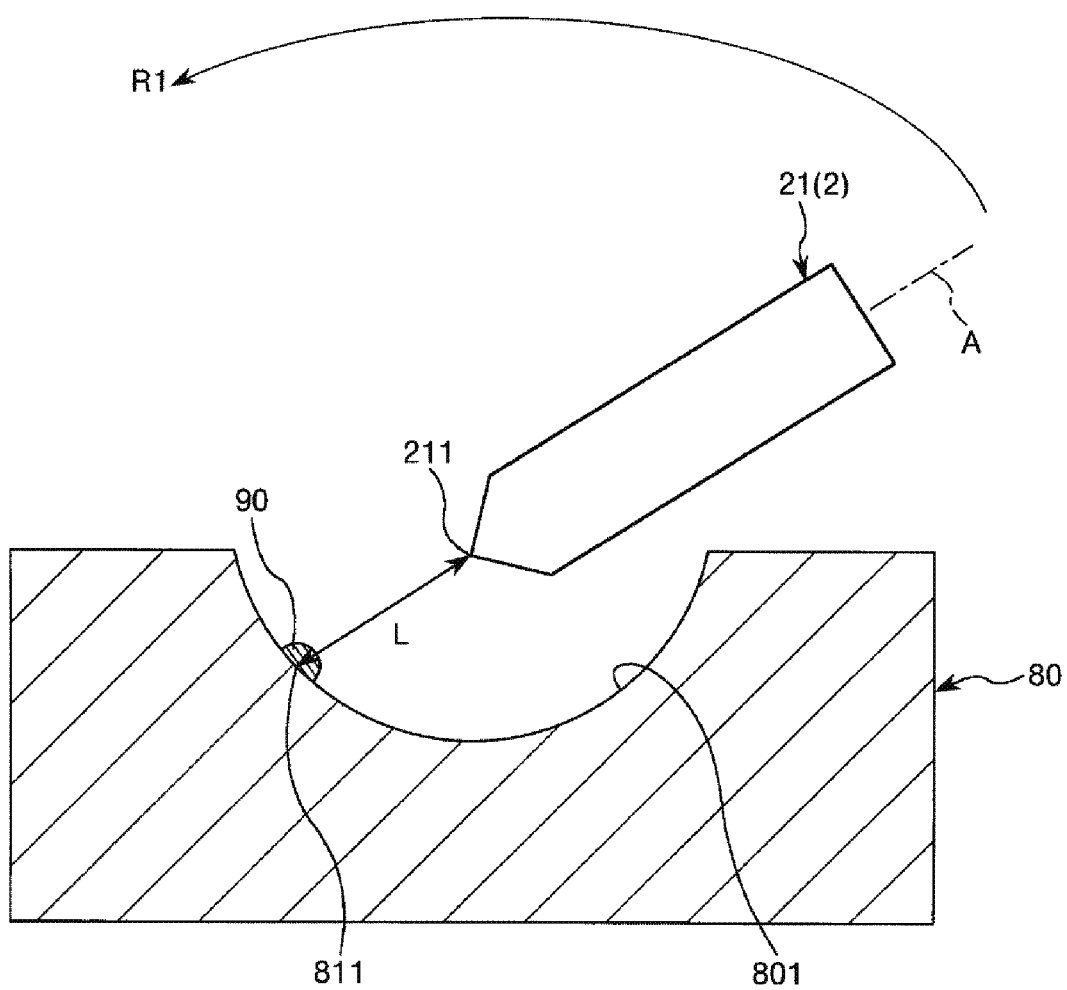
FIG. 3 is a diagram illustrating an example of discharge work to a recessed surface.

In the embodiment, the distance sensor 3 has a function of measuring a distance L between the dispenser 2 and the object 80 (precisely, distance between discharge port 211 and landing point 811) in a non-contact manner (refer to FIGS. 1 and 3). The measurement is performed at any time during work or at a predetermined time (for example, at a regular time interval) during work. For example, an ultrasound type sensor using ultrasound, a laser sensor using laser light, and the like can be used as the distance sensor 3. In particular, it is preferable to use the laser sensor. The laser sensor includes, for example, a light emitting element that emits the laser light to the object 80 and a light receiving element (not illustrated), and measures the distance L to the object 80 or the like based on a time in which the laser light emitted from the light emitting element is reflected by the object 80 and returned to the light receiving element. By using such a laser sensor, it is possible to measure the distance L with higher accuracy. Therefore, it is possible to further enhance accuracy of the discharge work.

The distance sensor 3 is attached to the dispenser in the embodiment, but the distance sensor 3 may be provided in the robot 1. For example, the distance sensor 3 may be provided in the fifth arm 15 or the sixth arm 16.

Control Unit

As illustrated in FIG. 1, the control unit 5 includes the robot control apparatus 51 connected to the robot 1 by a wire 591 and the discharge control apparatus 52 connected to the dispenser 2 by a wire 592. In the embodiment, the robot control apparatus 51 and the discharge control apparatus 52 are positioned on the lower side of the worktable 71 and connected to each other by a wire 593. A transmission path between the robot control apparatus 51 and the discharge control apparatus 52 may be wireless. Similarly, a transmission path between the robot 1 and the robot control apparatus 51, and a transmission path between the dispenser 2 and the discharge control apparatus 52 may be wireless. The robot control apparatus 51 and the discharge control apparatus 52 are respectively provided outside the robot 1, but may be incorporated inside the robot 1.

Robot Control Apparatus

The robot control apparatus 51 (control apparatus) is an apparatus that controls the driving of the robot 1, and is configured to have, for example, a computer (for example, personal computer (PC), programmable logic controller (PLC), or the like) in which a program (OS: operating system) is installed in the embodiment. The robot control apparatus 51 includes, for example, a central processing unit (CPU) as a processor, a random access memory (RAM), a read only memory (ROM), and the like.

As illustrated in FIG. 2, the robot control apparatus 51 includes a processing section 511 (calculation section), an accepting section 512, an output section 513, and a storage section 514, and is configured to be able to mutually exchange data between the sections.

The processing section 511 has a function of performing various calculations. The function of the processing section 511 can be realized, for example, by causing the CPU to execute various programs stored in the storage section 514 (RAM, ROM, and the like).

For example, the processing section 511 obtains data relating to a rotation amount and a rotation direction of the motor included in each driving section 130 based on a measurement result (signal) of each angle sensor 120. For example, the processing section 511 obtains a current position of the discharge port 211 of the dispenser 2 and a posture (direction) of the nozzle 21 by forward kinematics using a rotation angle (position of each joint) output from each angle sensor 120 at a predetermined period. The processing section 511 obtains a position of a landing point 811 where the discharge substance 90 lands on the object 80 using a calculated position of the discharge port 211 and a distance L to the object 80 output from the distance sensor 3 (refer to FIGS. 1 and 3). In the embodiment, the influence of gravity is not taken into account in the position of the landing point 811. The processing section 511 obtains a velocity V (movement velocity) at the time of the discharge based on the position and posture of the nozzle 21 and the distance L between the nozzle 21 and the object 80. The velocity V is velocities of trajectories 91, 92, and 93 drawn when the discharge substance 90 lands to the object 80 (refer to FIGS. 4 to 6). The velocity V is also referred to as a movement velocity of the landing point 811 in an arrow R0 direction on the object 80 (for example, on recessed surface 801) (refer to FIG. 4).

The accepting section 512 has a function of accepting the measurement results (information) output from the distance sensor 3 and each angle sensor 120 included in the robot 1. The function of the accepting section 512 can be realized, for example, by an interface circuit. The measurement result accepted by the accepting section 512 is stored, for example, in the storage section 514, and used for the calculation by the processing section 511.

The output section 513 has a function of outputting various pieces of data (information) to each motor driver 140 included in the robot 1 and the discharge control apparatus 52. The function of the output section 513 can be realized, for example, by an interface circuit.

The storage section 514 has a function of storing (recording) various pieces of data. The function of the storage section 514 can be realized, for example, by a RAM, a ROM, and an external storage apparatus (not illustrated). The storage section 514 stores, for example, data such as a target movement path of the discharge port 211 of the dispenser 2 in the discharge work and the velocity V, various programs, and the like.

The robot control apparatus 51 may include another function section other than the processing section 511, the accepting section 512, the output section 513, and the storage section 514 described above.

Discharge Control Apparatus

The discharge control apparatus 52 is an apparatus that controls the discharge (driving) of the dispenser 2, and is configured to have, for example, a computer in which a program (OS) is installed. The discharge control apparatus 52 includes, for example, a CPU as a processor, a RAM, a ROM, and the like.

As illustrated in FIG. 2, the discharge control apparatus 52 includes a processing section 521 (calculation section), an accepting section 522, an output section 523, and a storage section 524, and is configured to be able to mutually exchange data between the sections.

The processing section 521 has a function of performing various calculations. The function of the processing section 521 can be realized, for example, by causing the CPU to execute various programs stored in the storage section 524 (RAM, ROM, and the like). For example, the processing section 521 derives data relating to the discharge amount M, discharge timing, and the like of the discharge substance 90 to be discharged by the dispenser 2 based on information (signal) relating to the velocity V output from the robot control apparatus 51.

The accepting section 522 has a function of accepting various pieces of data (information) such as the information relating to the velocity V output from the robot control apparatus 51. The function of the accepting section 522 can be realized, for example, by an interface circuit. The information accepted by the accepting section 522 is stored, for example, in the storage section 524, and used for the calculation by the processing section 521.

The output section 523 has a function of outputting the data (information) relating to the discharge amount M and the discharge timing of the discharge substance 90 and the like to the dispenser 2. The function of the output section 523 can be realized, for example, by an interface circuit.

The storage section 524 has a function of storing (recording) various pieces of data. The function of the storage section 524 can be realized, for example, by a RAM, a ROM, and an external storage apparatus (not illustrated). The storage section 524 stores, for example, data such as the velocity V, the discharge amount M, and the discharge timing, and various programs.

The discharge control apparatus 52 may include another function section other than the processing section 521, the accepting section 522, the output section 523, and the storage section 524 described above.

For example, a display apparatus configured to have a liquid crystal display or the like having a monitor for displaying a screen and an input apparatus such as a mouse and a keyboard may be respectively connected to the control unit 5 (not illustrated). A touch panel may be connected to the control unit 5.

A basic configuration of the robot system 100 has been briefly described. Next, an example of the discharge work by such robot system 100 will be described.

Discharge Work to Recessed Surface

Figure 4:
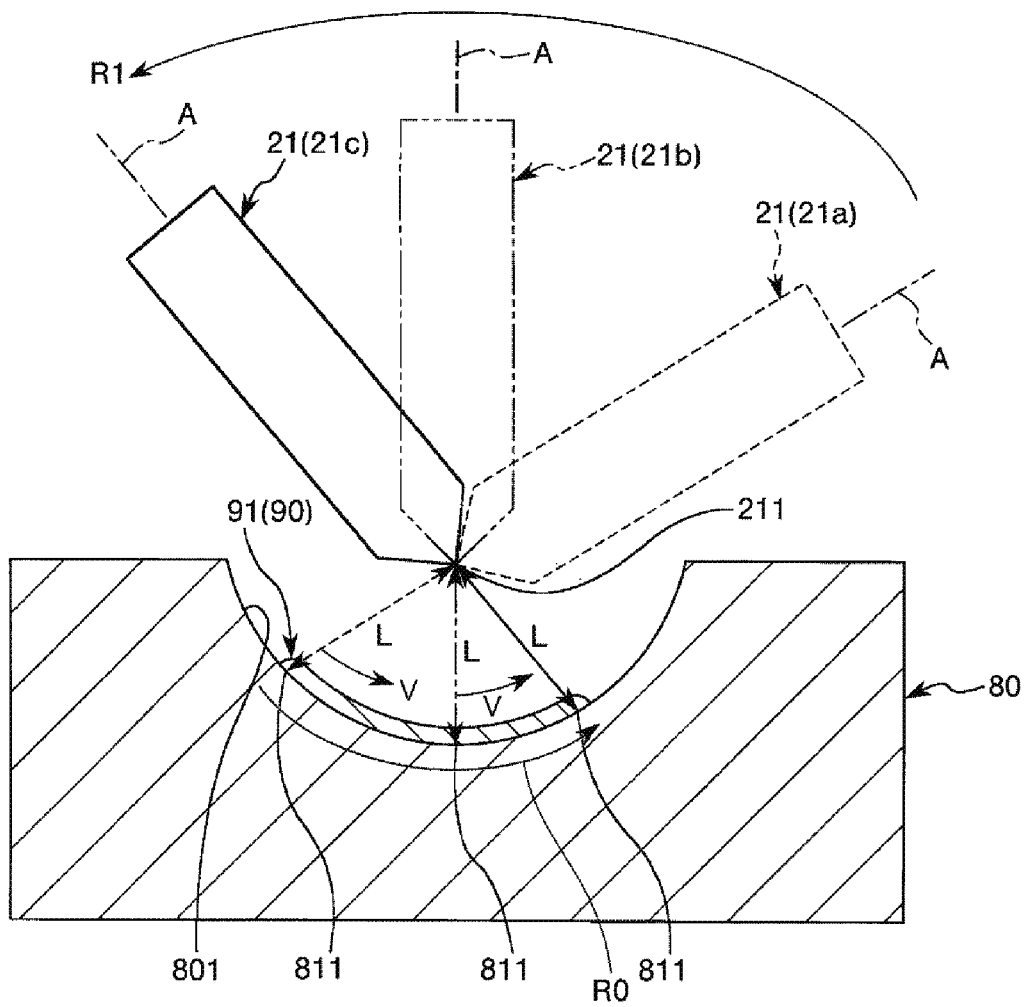
FIG. 4 is a diagram illustrating an example of the discharge work to the recessed surface.

FIGS. 3 and 4 are diagrams illustrating examples of the discharge work to a recessed surface.

In the discharge work, the control unit 5 mainly (1) controls a movement (movement velocity, movement amount, movement direction) of the nozzle 21 in the discharge work, (2) controls the discharge amount M of the discharge substance 90.

For example, discharge work for uniformly discharging the discharge substance 90 on a recessed surface 801 illustrated in FIG. 3 will be described as an example. That is, the discharge work for discharging the discharge substance 90 such that a thickness of the discharge substance 90 landing on the recessed surface 801 is constant will be described as the example. Here, the thickness of the discharge substance 90 refers to a thickness (deposition amount) of a layer of the discharge substance 90 formed on the recessed surface 801.

(1) The movement of the nozzle 21 in the discharge work is controlled.

For example, the robot control apparatus 51 drives the robot arm 10 by continuous path (CP) control to move the dispenser 2 (refer to FIGS. 1 and 3). In the embodiment, a reference point which is a reference when controlling the driving of the robot 1 is the discharge port 211 (specifically, the center of opening of discharge port 211). The CP control is control for driving the robot arm 10 such that the nozzle 21 takes a desired posture while the discharge port 211 moves following a target orbit by obtaining a current position and posture of the nozzle 21 (specifically, position of discharge port 211 and posture of nozzle 21) by forward kinematics using a rotation angle output from each angle sensor 120 at the predetermined period.

For example, a posture of the nozzle 21 (direction of center line A) is changed without changing a position of the discharge port 211 in the discharge work to the recessed surface 801 as illustrated in FIG. 4. As a premise, the recessed surface 801 is an arc surface such as a cylinder or a spherical surface, and the discharge port 211 is positioned at the center of the arc. A base end side of the nozzle 21 is moved in an arrow R1 direction while maintaining the position of the discharge port 211 fixed. The maintaining the position of the discharge port 211 fixed does not mean that the position is fixed physically, but means that the position of the discharge port 211 with respect to the recessed surface 801 is not changed due to operation control of each portion of the robot arm 10.

Specifically, a posture of the nozzle 21a indicated by the broken line in FIG. 4 is changed to a posture of the nozzle 21c indicated by the solid line in FIG. 4 through a posture of the nozzle 21b indicated by the two-dot chain line in FIG. 4. At this time, the robot arm 10 is driven by the CP control such that the nozzle 21 takes the postures of the nozzles 21a, 21b, and 21c by obtaining a current position and posture of the nozzle 21 by forward kinematics using a rotation angle output from each angle sensor 120 at the predetermined period. Thus, it is possible to move the nozzle 21 so as to trace on the recessed surface 801 by controlling the driving of the robot 1 by the CP control.

The control of the driving of the robot arm 10 is not limited to the control method described above, and may be, for example, point to point (PTP) control or the like. The reference point may be a point other than the center of the discharge port 211, and is any point.

(2) The discharge amount M of the discharge substance 90 is controlled.

The robot control apparatus 51 (A) obtains a velocity V (movement velocity) of a trajectory 91 drawn by the discharge substance 90 landing on the object 80 and (B) outputs the velocity V (information relating to velocity V) to the discharge control apparatus 52. The discharge control apparatus 52 (C) acquires the velocity V (information relating to velocity V) and calculates a discharge amount M according to the velocity V and (D) controls the driving of the supply mechanism 23 such that the dispenser 2 discharges the discharge amount M according to the velocity V.

(A) The robot control apparatus 51 obtains the velocity V of the trajectory 91.

As illustrated in FIG. 4, when the base end side of the nozzle 21 is moved in the arrow R1 direction while maintaining the position of the discharge port 211 fixed, the trajectory 91 is drawn along the arrow R0 direction.

It is possible to obtain the velocity V by adding a distance L from the discharge port 211 to the landing point 811 where the discharge substance 90 lands on the object 80 as an offset to the discharge port 211 used in the forward kinematics calculation described above. That is, it is possible to obtain the velocity V based on the position of the landing point 811 obtained by the position of the discharge port 211 and the distance L between the discharge port 211 and the landing point 811 at a constant period. In the embodiment, the distance L uses information output from the distance sensor 3. In the embodiment, since the discharge work for uniformly discharging the discharge substance 90 is described as the example, the distance L and the velocity V are respectively constant.

For example, the robot control apparatus 51 obtains the position of the landing point 811 using the position of the discharge port 211 obtained by using the rotation angle output from each angle sensor 120 at the predetermined period and the distance L obtained by the distance sensor 3. Thus, the velocity V of the trajectory 91 is obtained from the predetermined period (time) and the position of the discharge port 211.

(B) The robot control apparatus 51 outputs the velocity V.

The robot control apparatus 51 outputs the velocity V (information relating to velocity V) to the discharge control apparatus 52, for example, as an analog signal. The robot control apparatus 51 may output a digital signal. Whether it is the analog signal or the digital signal may be determined according to a configuration of the discharge control apparatus 52. The analog signal or the digital signal is represented by a current or a voltage.

(C) The discharge control apparatus 52 calculates the discharge amount M according to the velocity V.

The discharge control apparatus 52 stores data relating to the discharge amount M per unit time according to the velocity V, and calculates the discharge amount M per unit time according to the acquired velocity V. For example, the velocity V and the discharge amount M are in a proportional relationship, and the discharge amount M also increases as the velocity V increases. A determination factor of the velocity V includes magnitude of the distance L in addition to the movement velocity of the nozzle 21 in the arrow R1 direction. Such configuration is particularly effective in a case where the thickness of the discharge substance 90 landing on the recessed surface 801 is made constant as in the embodiment.

(D) The discharge control apparatus 52 controls the driving of the supply mechanism 23.

The discharge control apparatus 52 stores data relating to a driving control amount (driving voltage of motor and the like) of the supply mechanism 23 with respect to the discharge amount M per unit time, and controls the driving of the supply mechanism 23 according to the obtained discharge amount M. Accordingly, it is possible to discharge the discharge substance 90 with the discharge amount M according to the velocity V from the discharge port 211 of the nozzle 21.

The discharge control apparatus 52 is associated with the control of the driving of the robot arm 10 by the robot control apparatus 51, and controls the dispenser 2 so as to start or end the discharge at a predetermined timing in accordance with the driving of the robot arm 10.

Thus, the robot system 100 according to the embodiment controls the driving of the robot arm 10 and the discharge amount M according to the velocity V of the trajectory 91 in the discharge work with respect to the recessed surface 801.

Discharge Work to Flat Surface

Figure 5:
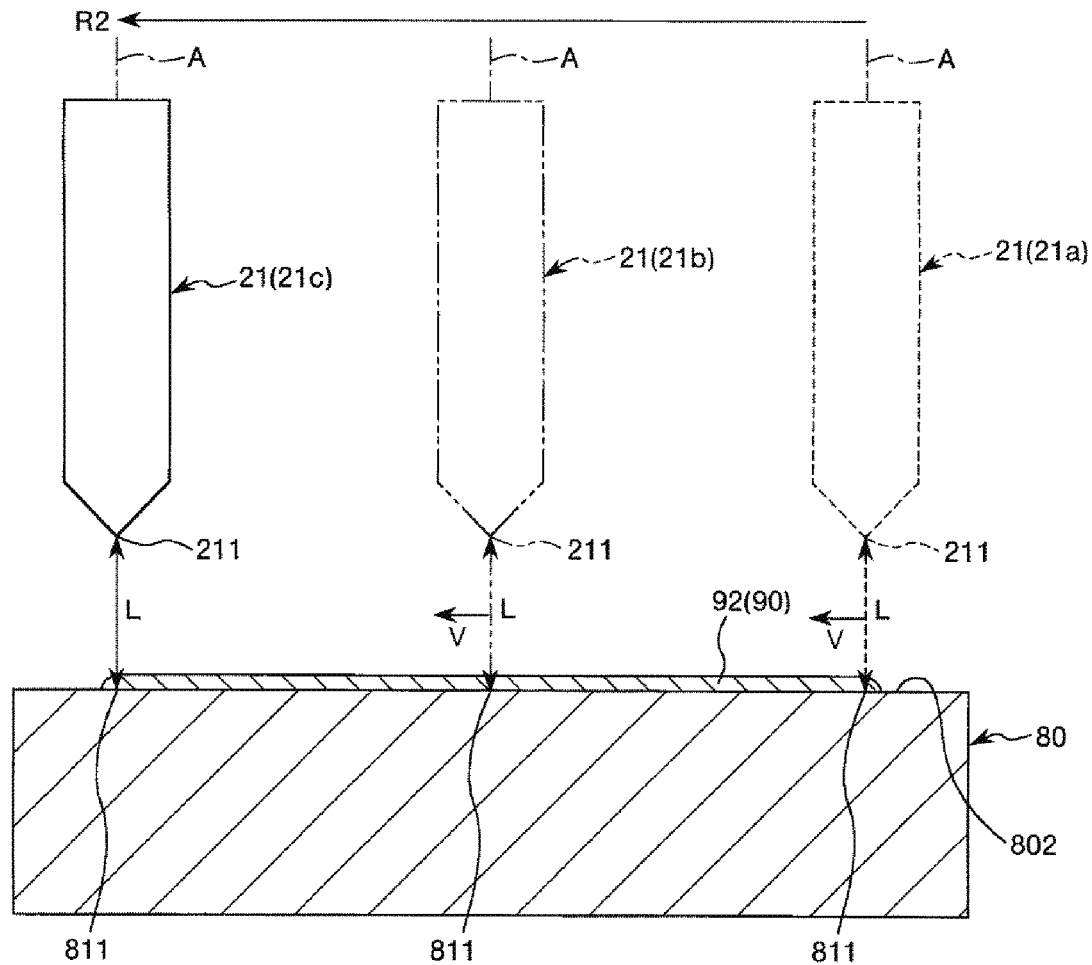
FIG. 5 is a diagram illustrating an example of the discharge work to a flat surface.

FIG. 5 is a diagram illustrating an example of the discharge work to a flat surface.

Next, discharge work for uniformly discharging the discharge substance 90 to an object 80 having a flat surface 802 illustrated in FIG. 5 will be described as an example. The description of the same matters as the discharge work to the recessed surface 801 described above will be omitted.

(1) The movement of the nozzle 21 in the discharge work is controlled.

In the discharge work to the flat surface 802 illustrated in FIG. 5, a position of the discharge port 211 and a posture of the nozzle 21 are changed such that the discharge port 211 is moved linearly along the flat surface 802 by the CP control. Specifically, the nozzle 21 is moved along an arrow R2 direction. That is, a position and posture of the nozzle 21a indicated by the broken line in FIG. 5 is changed to a position and posture of the nozzle 21c indicated by the solid line in FIG. 5 through a position and posture of the nozzle 21b indicated by the two-dot chain line in FIG. 5.

(2) The discharge amount M of the discharge substance 90 is controlled.

Similarly to the discharge work to the recessed surface 801 described above, the robot control apparatus 51 also (A) obtains a velocity V of a trajectory 92 drawn by the discharge substance 90 landing on the object 80 and (B) outputs information relating to the velocity V to the discharge control apparatus 52 in the discharge work to the flat surface 802 illustrated in FIG. 5. The discharge control apparatus 52 (C) calculates a discharge amount M according to the velocity V and (D) controls the driving of the supply mechanism 23.

As illustrated in FIG. 5, when the nozzle 21 is moved along the arrow R2 direction, the trajectory 92 is drawn along the arrow R2 direction. The velocity V of the trajectory 92 and a movement velocity of the discharge port 211 coincide with each other in the discharge work to the flat surface 802.

Discharge Work to Projected Surface

Figure 6:
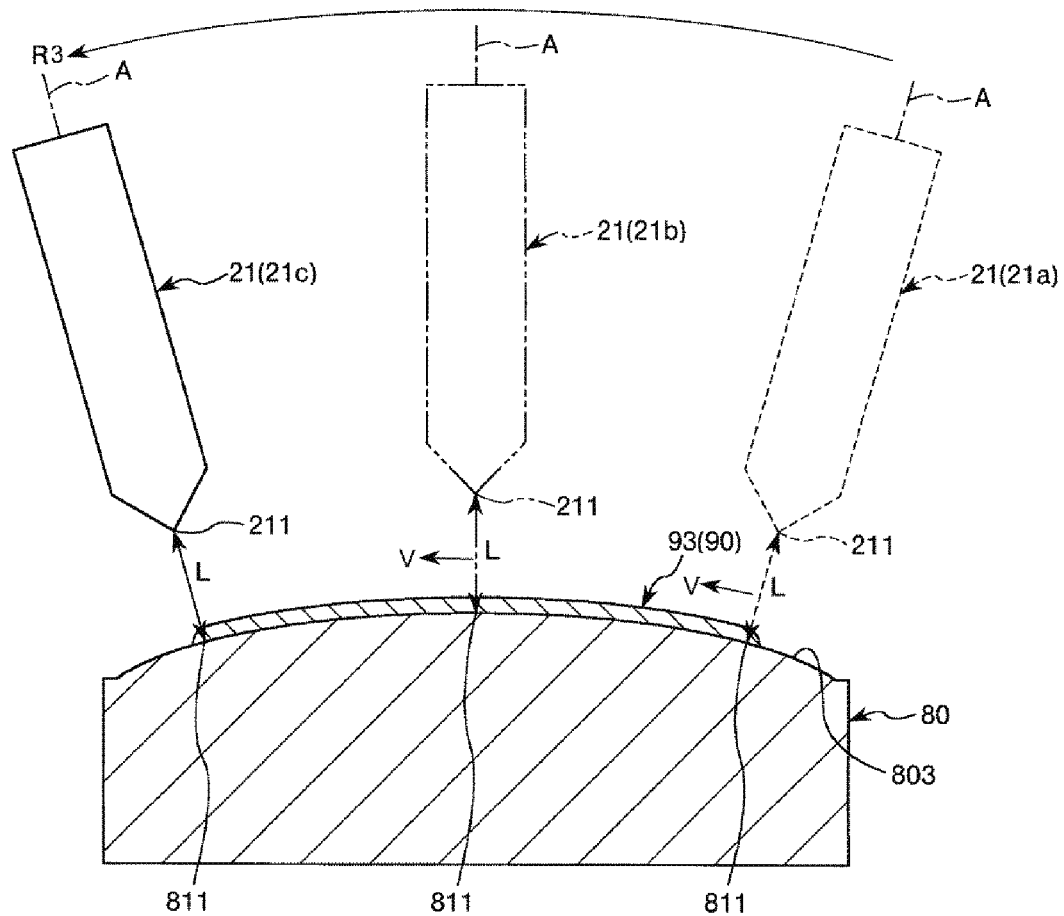
FIG. 6 is a diagram illustrating an example of the discharge work to a projected surface.

FIG. 6 is a diagram illustrating an example of the discharge work to a projected surface.

Next, discharge work for uniformly discharging the discharge substance 90 to an object 80 having a projected surface 803 illustrated in FIG. 6 will be described as an example. The description of the same matters as the discharge work to the recessed surface 801 described above will be omitted.

(1) The movement of the nozzle 21 in the discharge work is controlled.

In the discharge work to the projected surface 803 illustrated in FIG. 6, a position of the discharge port 211 and a posture of the nozzle 21 are changed such that the discharge port 211 is moved in an arc shape along the projected surface 803 by the CP control. Specifically, the nozzle 21 is moved along an arrow R3 direction. That is, a position and posture of the nozzle 21a indicated by the broken line in FIG. 6 are changed to a position and posture of the nozzle 21c indicated by the solid line in FIG. 6 through a position and posture of the nozzle 21b indicated by the two-dot chain line in FIG. 6.

(2) The discharge amount M of the discharge substance 90 is controlled.

Similarly to the discharge work to the recessed surface 801 described above, the robot control apparatus 51 also (A) obtains a velocity V of a trajectory 93 drawn by the discharge substance 90 landing on the object 80 and (B) outputs information relating to the velocity V to the discharge control apparatus 52 in the discharge work to the projected surface 803 illustrated in FIG. 6. The discharge control apparatus 52 (C) calculates a discharge amount M according to the velocity V and (D) controls the driving of the supply mechanism 23.

As illustrated in FIG. 6, when the nozzle 21 is moved along the arrow R3 direction, the trajectory 93 is drawn along the arrow R3 direction. The velocity V of the trajectory 93 and a movement velocity of the discharge port 211 are in the proportional relationship in the discharge work to the projected surface 803.

Thus, the robot system 100 according to the embodiment can draw the target trajectories 91, 92, and 93 with respect to the objects 80 having various shapes by controlling the driving of the robot arm 10 to move the dispenser 2 and controlling the discharge amount M according to the velocity V.

In the embodiment, the case where the discharge substance 90 is continuously discharged on the object 80 is described as the example, but the discharge substance 90 may be intermittently discharged on the object 80. In this case, the control of the discharge amount M may be performed using velocities V of trajectories 91, 92, and 93 drawn by assuming that the discharge substance 90 lands also on a discontinuous part. As described above, the velocity V (movement velocity) is the velocities of the trajectories 91, 92, and 93 drawn when the discharge substance 90 lands on the object 80. However, in a case where the discharge substance 90 is intermittently discharged, the velocity V is the velocity V of the trajectory drawn by assuming that the discharge substance lands on the object.

The recessed surface 801, the flat surface 802, and the projected surface 803 have been respectively described. However, there is also a case where the discharge substance 90 lands on a surface having a different shape in which the surfaces described above are combined one-dimensionally or two-dimensionally, and a layer of the discharge substance 90 is formed. In this case, a combination of the above may be performed as appropriate.

As for the recessed surface 801, the flat surface 802, and the projected surface 803 described above, the case where the distance L is constant during the movement of the nozzle 21 (during movement of discharge port 211) is described. However, it is also possible to deal with a case where the distance L sequentially changes. In this case, the distance sensor 3 sequentially (in real time) measures the changing distance L, a velocity V is obtained each time according to a value of the distance L, and the control of the discharge amount M is performed using the velocity V as described above. Accordingly, appropriate control becomes possible regardless of the value of the distance L.

As described above, the robot control apparatus is the control apparatus that controls the robot 1 supporting the dispenser 2 (discharge section). The robot control apparatus 51 includes the processing section 511 (calculation section) that calculates the velocity V (movement velocity) of the landing point 811 where the discharge substance 90 discharged from the discharge port 211 of the dispenser 2 (discharge section) to the object 80 lands on the object 80. The velocity V obtained by the processing section 511 is used for controlling the discharge amount M of the discharge substance 90.

According to such a robot control apparatus 51, it is possible to use the drawing velocity of the trajectory (or trajectories 92 and 93) drawn by the discharge substance 90 landing on the object 80, that is, the velocity V at the landing point 811 for controlling the discharge amount M. Therefore, since the target trajectory 91 (or trajectories 92 and 93) can be drawn regardless of a shape and the like of the object 80, it is possible to discharge the discharge substance 90 with a desired discharge amount M to a target place. As a result, it is possible to realize the discharge work with higher quality. Therefore, it is possible to reduce that the discharge substance 90 becomes a lump on the object 80. It is also possible to reduce that a width of the discharged discharge substance 90 becomes thicker or thinner than planned width in the discharge work for uniformly discharging the discharge substance 90. Thus, the control using the discharge amount M obtained based on the velocity V is particularly effective in the discharge work for uniformly discharging the discharge substance 90, that is, in the discharge work in the case where the thickness of the discharge substance 90 discharged on the object 80 is constant.

In the embodiment, the thickness of the discharge substance 90 discharged on the object 80 is constant, but the thickness thereof may be thick at a certain place or thin at a certain place. The distance L may be constant or may not be constant.

In a case where the thickness of the layer of the discharge substance 90 is not constant, for example, the thickness thereof changes in the middle, a discharge amount M' (=K×M) obtained by multiplying the discharge amount M obtained as described above by a predetermined coefficient K set to correspond to the change in thickness is set as the velocity V, and the discharge amount M' may be executed.

As described above, the robot control apparatus 51 controls the driving of the robot 1 so as to change the posture of the dispenser 2 (specifically, posture of nozzle 21) while maintaining the position of the discharge port 211 fixed (without changing) in the discharge by the dispenser 2 (discharge section), specifically, in the discharge work to the recessed surface 801, for example. Accordingly, even in a case where the movement velocity of the discharge port 211 of the dispenser 2 and the velocity V at the landing point 811 do not coincide with each other as in the recessed surface 801, since the discharge amount M is obtained using the velocity V, it is possible to draw the target trajectory 91 (or trajectories 92 and 93). Consequently, it is possible to discharge the discharge substance 90 with the desired discharge amount M to the target place.

Here, if the control of the discharge amount M is performed using the movement velocity of the discharge port 211 instead of the velocity V, a uniform discharge can be performed in the discharge work to the flat surface 802 and the projected surface 803, but the uniform discharge cannot be performed in the discharge work to the recessed surface 801.

More specifically, the velocity V and the movement velocity of the discharge port 211 coincide with each other in the discharge work to the flat surface 802 as described above. The velocity V and the movement velocity of the discharge port 211 are in the proportional relationship in the discharge work to the projected surface 803. Therefore, even if the control of the discharge amount M is performed using the movement velocity of the discharge port 211, it is possible to perform the same control as the case where the control of the discharge amount M is performed using the velocity V. However, in the discharge work to the recessed surface 801, the velocity V and the movement velocity of the discharge port 211 do not coincide with each other and are not in the proportional relationship. Therefore, if the control of the discharge amount M is performed using the movement velocity of the discharge port 211, it is impossible to draw the target trajectory 91. For example, since the movement velocity of the discharge port 211 is zero in the discharge work to the recessed surface 801 as described above, if the control of the discharge amount M is performed using the movement velocity of the discharge port 211, the discharge is not performed.

Thus, if the control of the discharge amount M is performed using the movement velocity of the discharge port 211, there is the case where it is impossible to draw the target trajectory 91 depending on the shape of the object 80. On the contrary, in the embodiment, since the control of the discharge amount M of the discharge substance 90 is performed using the velocity V as described above, it is possible to draw the target trajectory 91. Therefore, it is possible to discharge the discharge substance 90 with the desired discharge amount M to the target place regardless of the shape of the object 80 by controlling the discharge amount M of the discharge substance 90 using the velocity V.

The position of the landing point 811 is obtained based on the distance L between the discharge port 211 (specifically, the center of opening of discharge port 211) and the landing point 811, and the position of the discharge port 211 (specifically, the center of opening of discharge port 211). Accordingly, it is possible to easily and appropriately obtain the velocity V at the landing point 811.

The position of the landing point 811 is not limited to the position calculated based on the distance L and the position of the discharge port 211. For example, the position thereof may be a position calculated based on a distance between a random place in the robot 1 and the landing point 811, and a position of the random place. In this case, the distance sensor 3 may be configured so as to measure the distance between the random place and the landing point 811. A predetermined (stored) coordinate value may be used as the position of the landing point 811.

Further, the distance L is a distance between the discharge port 211 and the object 80 in a discharge direction in which the dispenser 2 (discharge section) discharges the discharge substance 90. The discharge direction is a direction along the center line A of the nozzle 21, passing through the center of the opening of the discharge port 211. Accordingly, it is possible to appropriately obtain the velocity V at the landing point 811.

The distance L may not be the distance in the direction along the discharge direction in which the discharge substance 90 is discharged. For example, the distance L may be a distance in a direction considering the discharge direction in which the discharge substance 90 is discharged and a gravity direction. That is, the landing point 811 may be a position considering, for example, the gravity direction.

It is preferable that the distance L is obtained based on information output from the distance sensor 3. Accordingly, it is possible to appropriately obtain the velocity V at the landing point 811. Even in a case where the distance L is not constant, it is possible to draw the target trajectory 91 and the like by using the distance sensor 3.

The distance L may be measured in real time while discharging the discharge substance 90 to the object 80 or measured in advance before performing the discharge work for discharging the discharge substance 90 to the object 80.

In the embodiment, the distance L is obtained using the distance sensor 3, but the distance L may be a value set (stored) in advance. Accordingly, it is possible to obtain the discharge amount M more quickly. For example, when the shape of the object 80 is provided as CAD data and a position relationship between the object 80 and the robot 1 is determined, it is possible to obtain the distance L by calculation. As a specific method, for example, a coating trajectory (target coating orbit) is created in the CAD data of the object 80, and a trajectory (target orbit) of the discharge port 211 that makes the distance L between the discharge port 211 and the object 80 constant is created based on the position relationship between the robot 1 and the object 80, and the coating trajectory. Then, an operation of the robot 1 for realizing the trajectory of the discharge port 211 is obtained by inverse kinematics calculation and is executed.

Accordingly, it is possible to perform the discharge work (coating work) using the distance L set in advance.

The robot control apparatus 51 (control apparatus) includes the output section 513 that outputs the velocity V (movement velocity) obtained by the processing section 511 (calculation section) to the discharge control apparatus 52 for controlling the discharge by the dispenser 2 (discharge section). Accordingly, the discharge control apparatus 52 acquires the velocity V and obtains the discharge amount M according to the acquired velocity V. Therefore, the discharge control apparatus can control the dispenser 2 so as to accurately draw the target trajectory 91 and the like regardless of the shape and the like of the object 80.

The object 80 may be moved during the discharge work. For example, the worktable 71 may be configured so as to move the object 80 (refer to FIG. 1). In this case, for example, in the discharge work to the recessed surface 801 illustrated in FIG. 4, it is preferable to move the object 80 in a direction perpendicular to the paper surface of FIG. 4. Accordingly, it is possible to apply the discharge substance 90 to an area of a wider range of the recessed surface 801 in a shorter time.

As described above, the robot system 100 includes the robot control apparatus 51 (control apparatus), the robot 1 controlled by the robot control apparatus 51, the dispenser 2 (discharge section) which is provided in the robot 1 and is capable of discharging the discharge substance 90. According to the robot system 100, since it is possible to control the robot 1 by the robot control apparatus 51 as described above, it is possible to draw the target trajectory 91 and the like. Therefore, according to the robot system 100, it is possible to discharge the discharge substance 90 with the desired discharge amount M to the target place. Consequently, it is possible to realize the discharge work with higher quality.

Second Embodiment

Next, a second embodiment of the invention will be described.

Figure 7:
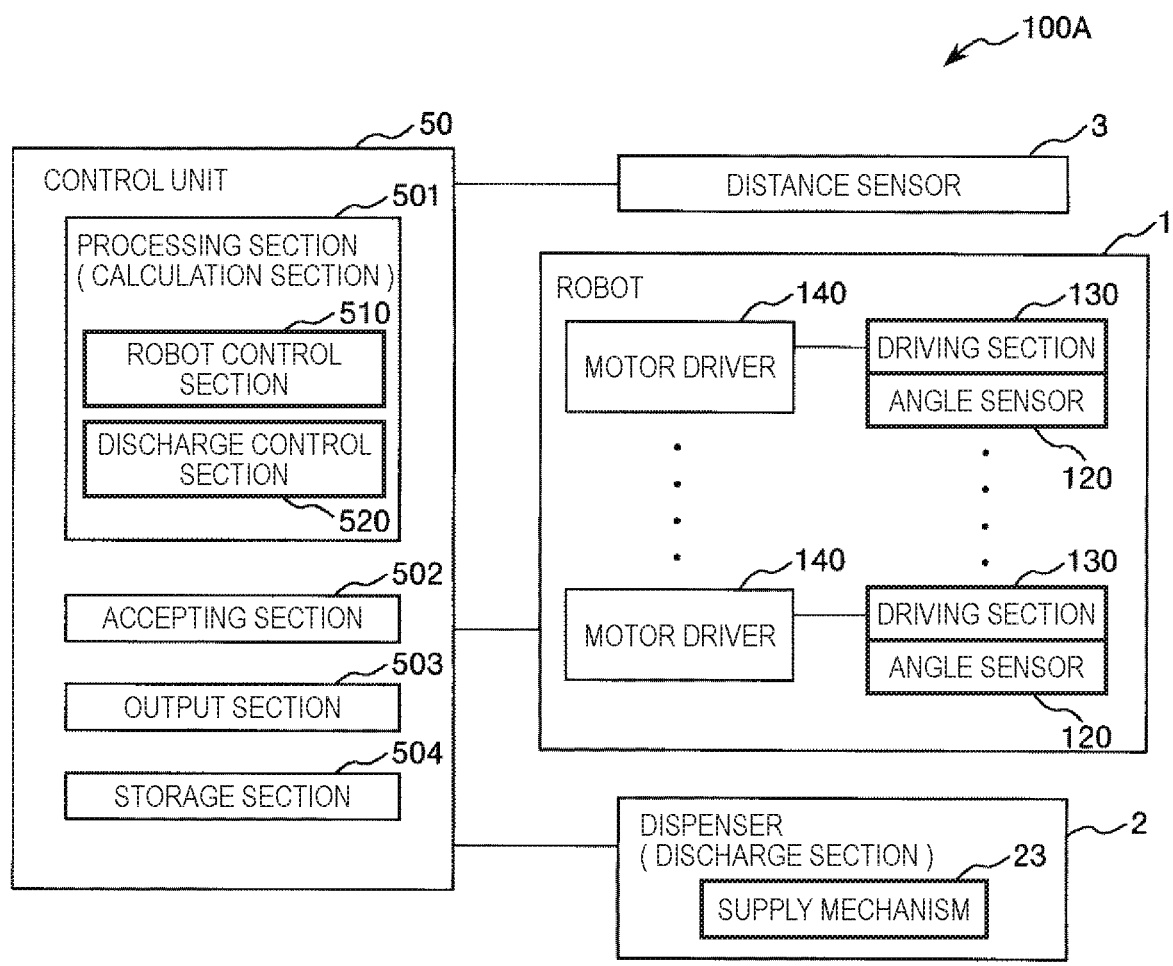
FIG. 7 is a system configuration diagram of a robot system according to a second embodiment.

FIG. 7 is a system configuration diagram of a robot system according to the second embodiment.

The embodiment is the same as the embodiment described above except that a configuration of the control apparatus is different. In the following description, differences from the embodiment described above will be mainly described in the second embodiment, and description of the same matters will be omitted.

The robot system 100A illustrated in FIG. 7 includes a control apparatus 50. The control apparatus 50 has the same functions as the robot control apparatus 51 and the discharge control apparatus 52 in the first embodiment described above, and has a configuration in which the apparatuses are integrated.

Specifically, the control apparatus 50 includes a processing section 501 (calculation section), an accepting section 502, an output section 503, and a storage section 504.

The processing section 501 includes a robot control section 510 that performs various calculation and the like relating to the driving of the robot 1 (controls driving of the robot 1) and a discharge control section 520 that performs various calculation and the like relating to the discharge by the dispenser 2 (controls discharge by dispenser 2). The robot control section 510 has the same function as the processing section 511 in the first embodiment, and the discharge control section 520 has the same function as the processing section 521 in the first embodiment.

The accepting section 502 has the same function as the accepting section 512 in the first embodiment and has a function of accepting measurement results (signals) from the distance sensor 3 and each angle sensor 120 included in the robot 1.

The output section 503 has the same functions as the output section 513 and the output section 523 in the first embodiment, a function of outputting various pieces of data (information) to each motor driver 140 included in the robot 1 and the discharge control apparatus 52, and a function of outputting data (information) relating to an amount and a discharge timing of the discharge substance 90 and the like to the dispenser 2.

The storage section 504 has the same functions as the storage section 514 and the storage section 524 in the first embodiment, and a function of storing (recording) data of various programs and the like.

As described above, the control apparatus 50 includes the discharge control section 520 that controls the discharge by the dispenser 2 (discharge section) in the embodiment. That is, the control apparatus 50 includes the robot control section 510 that controls the driving of the robot 1 and the discharge control section 520 that controls the discharge by the dispenser 2. Accordingly, it is possible to achieve miniaturization and simplification of the control apparatus 50.

The control apparatus 50 may be incorporated inside the robot 1 (for example, inside the base 110) or provided outside the robot 1.

According to the second embodiment as described above, it is also possible to discharge the discharge substance 90 with the desired discharge amount M to the target place regardless of the shape of the object 80.

The control apparatus, the robot, and the robot system according to the invention have been described based on the illustrated embodiments. However, the invention is not limited thereto, and the configuration of each section can be replaced with a predetermined configuration having the same function. Another predetermined component may be added to the invention. Each embodiment may be appropriately combined.

The "discharge substance" is not limited to the adhesive, and may be any substance as long as it can be discharged from the discharge section, such as various painting materials, paint, various coating materials, ink, food, or the like. A form of the discharge substance is not limited to the liquid form and may be, for example, a gaseous form, a gel form, a solid form, or the like.

The "object" is not limited to the precision instrument such as the wristwatch and the mobile phone, the parts thereof, or the like, and may be any object as long as it has a surface on which the discharge substance can land.

The "discharge section" may be a configuration that is capable of discharging the discharge substance, and is not limited to the dispenser described above. For example, the discharge section may be a coating appliance for coating the discharge substance such as grease or the like, a food discharge appliance for discharging a food, or the like.

The robot according to the invention may be a robot other than the vertical articulated robot and may be a horizontal articulated robot or a parallel link robot.

The entire disclosure of Japanese Patent Application No. 2017-097040, filed May 16, 2017 is expressly incorporated by reference herein.

What is claimed is:

1. A control apparatus for a robot having a dispenser, the control apparatus comprising:
   a memory configured to store computer-executable instructions; and
   a processor configured to execute the computer-executable instructions so as to:
      obtain a distance between each landing point of a discharge substance on a target object and a discharge port of the dispenser in response to a signal from a distance sensor attached on the robot, the discharge substance being continuously discharged from the discharge port toward all of the landing points on the target object along each discharge direction while a relative position of the discharge port of the dispenser with respect to a trajectory of the landing points of the discharge substance on the target object changes;
      obtain each angle of each of the discharge directions with respect to a corresponding point of the landing points of the discharge substance on the target object based on a signal from an angular sensor coupled to the robot;
      calculate a movement velocity of a substance hit point on the trajectory of the landing points on the target object by continuously obtaining the distances and the angles while the processor controls movement of the dispenser with respect to the target object and the discharge substance is continuously discharged from the discharge port along the trajectory of the landing points; and
      control a discharge amount of the discharge substance from the dispenser based on the movement velocity of the substance hit point so as to discharge the discharge substance on the target object along the trajectory of the landing points.

2. The control apparatus according to claim 1, wherein the robot is a vertical articulated robot.

3. The control apparatus according to claim 1, wherein, when the discharge substance is discharged from the discharge port of the dispenser toward the target object along the trajectory of the landing points on the target object, the processor is further configured to control the robot to change a posture of the dispenser and maintain a position of the discharge port at a same location according to a shape of the landing points of the target object.

4. A robot system comprising:
   a dispenser having a discharge port, the dispenser being configured to continuously discharge a discharge substance from the discharge port toward a target object;
   a robot that supports the dispenser;
   a distance sensor attached on the robot, the distance sensor being configured to detect a distance between a landing point of the discharge substance on the target object and the discharge port of the dispenser so as to output a signal corresponding to the detected distance;
   an angular sensor coupled to the robot, the angular sensor being configured to detect an angle of a discharge direction of the discharge substance with respect to a corresponding point of the landing points of the discharge substance on the target object so as to output a signal corresponding to the detected angle;
   a memory configured to store computer-executable instructions; and
   a processor configured to execute the computer-executable instructions so as to:
      obtain the distance between each landing point of the discharge substance on the target object and the discharge port of the dispenser in response to the signal from the distance sensor, the discharge substance being continuously discharged from the discharge port toward all of the landing points on the target object along each discharge direction while a relative position of the discharge port of the dispenser with respect to a trajectory of the landing points of the discharge substance on the target object changes;
      obtain each angle of each of the discharge directions with respect to the corresponding point of the landing points of the discharge substance on the target object based on the signal from the angular sensor;
      calculate a movement velocity of a substance hit point on the trajectory of the landing points on the target object by continuously obtaining the distances and the angles while the processor controls movement of the dispenser with respect to the target object and the discharge substance is continuously discharged from the discharge port along the trajectory of the landing points; and
      control a discharge amount of the discharge substance from the dispenser based on the movement velocity of the substance hit point so as to discharge the discharge substance on the target object along the trajectory of the landing points.

5. The robot system according to claim 4, wherein the robot is a vertical articulated robot.

6. The robot system according to claim 4, wherein, when the discharge substance is discharged from the discharge port of the dispenser toward the target object along the trajectory of the landing points on the target object, the processor is further configured to control the robot to change a posture of the dispenser and maintain a position of the discharge port at a same location with respect to the target object according to a shape of the landing points of the target object.

* * * * *